United States Patent [19]

Terrel

[11] Patent Number: 5,078,543
[45] Date of Patent: Jan. 7, 1992

[54] STORAGE SYSTEM FOR SOLID WASTE MATERIAL

[76] Inventor: Ronald L. Terrel, 9703 - 241st Place Southwest, Edmonds, Wash. 98020

[21] Appl. No.: 550,908

[22] Filed: Jul. 11, 1990

[51] Int. Cl.$^5$ .............................................. E02D 3/12
[52] U.S. Cl. .................................... 405/128; 405/265; 405/270; 404/82
[58] Field of Search ...................... 405/54, 55, 57, 128, 405/129, 265, 268, 270; 404/82

[56] References Cited

U.S. PATENT DOCUMENTS

| | | | |
|---|---|---|---|
| 2,771,745 | 11/1956 | Bramble | 405/270 |
| 3,160,312 | 12/1964 | Cash et al. | 405/270 X |
| 3,344,608 | 10/1967 | McEachran | 405/265 |
| 3,474,625 | 10/1969 | Draper et al. | 405/270 |
| 3,831,382 | 8/1974 | Califano et al. | 405/265 |
| 3,979,916 | 9/1976 | Califano et al. | 405/265 |
| 4,041,712 | 8/1977 | Stephen, Jr. et al. | 405/265 |
| 4,166,709 | 9/1979 | Valiga | 405/128 |
| 4,350,461 | 9/1982 | Voliga et al. | 405/128 |
| 4,362,434 | 12/1982 | Valiga et al. | 405/128 |
| 4,708,516 | 11/1987 | Miller | 404/82 X |

OTHER PUBLICATIONS

Tessel et al., "Using Additives and Modifiers in Hot Mix Asphalt (Part A)", National Asphalt Pavement Association.

*Primary Examiner*—David H. Corbin
*Assistant Examiner*—Arlen L. Olsen
*Attorney, Agent, or Firm*—Seed and Berry

[57] ABSTRACT

A storage system for solid waste material has a sloped storage basin with a subgrade covered by a 3-layer liner comprising top and bottom liquid impermeable layers separated by a drainage layer. The top layer drains into a leachate collection site and the drainage layer drains into a secondary collection site for detection of leakage through the top layer. A cap covers solid waste material stored on the liner. The top and bottom layers of the liner, and an upper layer of the cap are preferably dense-graded asphalt cement, and the drainage layer of the liner is preferably open-graded asphalt cement.

4 Claims, 1 Drawing Sheet

STORAGE SYSTEM FOR SOLID WASTE MATERIAL

TECHNICAL FIELD

The present invention relates to solid waste storage, and more particularly to a system by which large quantities of said waste materials can be safely stored on a long-term basis.

BACKGROUND OF THE INVENTION

Heightened awareness of the consequences of poor practice in the disposal and storage of waste materials has led to governmental regulations requiring improved waste management systems. As a result, systems using a combination of synthetic flexible membrane liners and clay layers and incorporating leachate detection and collection procedures have been designed to meet stringent standards. However, such systems are relatively expensive and difficult to construct, particularly for large storage areas. As a consequence, most liners for non-hazardous waste are constructed of clay, it having been assumed from laboratory tests that if clay were compacted to a reasonably high density in a liner, it would be impermeable to water. Unfortunately, it has been found from field trials that typical clay clods or clumps are often not broken down to as small particles as in laboratory tests. Consequently, water passing through field compacted clay tends to flow around and between soil clods in much same way as if the clods were mineral aggregate particles. Furthermore, during full-scale construction operations in the field under varying soil, terrain, and weather conditions, it is very difficult to achieve the uniformity of mixing and compaction required for waste storage liners. The overall result is that, generally, field clay liners turn out to be significantly more permeable than initially predicted from laboratory tests.

A further problem with the current system is the installation and maintenance of the synthetic membrane (geomembrane) placed on top of the clay layer. For large areas, seams or joints need to be welded or glued watertight. The membranes are easily punctured by construction equipment or large animals and they are difficult to maintain watertight. In addition, they are very expensive to construct because of the hand-labor required.

SUMMARY OF THE INVENTION

The present invention aims to provide a safe, practical and effective system for large scale, long-term storage of solid waste materials which utilizes polymer modified, hot mix asphalt cement materials and utilizes highway construction skills and equipment. In the practice of the present invention, a storage basin is prepared which is sloped to drain into a leachate collection site. The storage basin is faced with a three-layer liner having top and bottom liquid-impermeable layers and an intermediate drainage layer. The upper surface of the liner drains to the collection basin and the upper surface of the bottom layer of the liner drains to a secondary collection site for detection of leachate in case of failure of the impermeability of the top layer. When the storage basin is full of solid waste material, it is covered with a cap having a top impermeable layer and sloped for collection of rain water.

In the practice of the invention it is preferred that the top and bottom impermeable layers of the liner and the top impermeable layer of the cap be made of dense-graded, polymer-modified, hot mix asphalt concrete, and that the intermediate permeable layer of the liner be made of open-graded hot mix asphalt concrete.

DETAILED DESCRIPTION OF THE INVENTION

Figure 1:
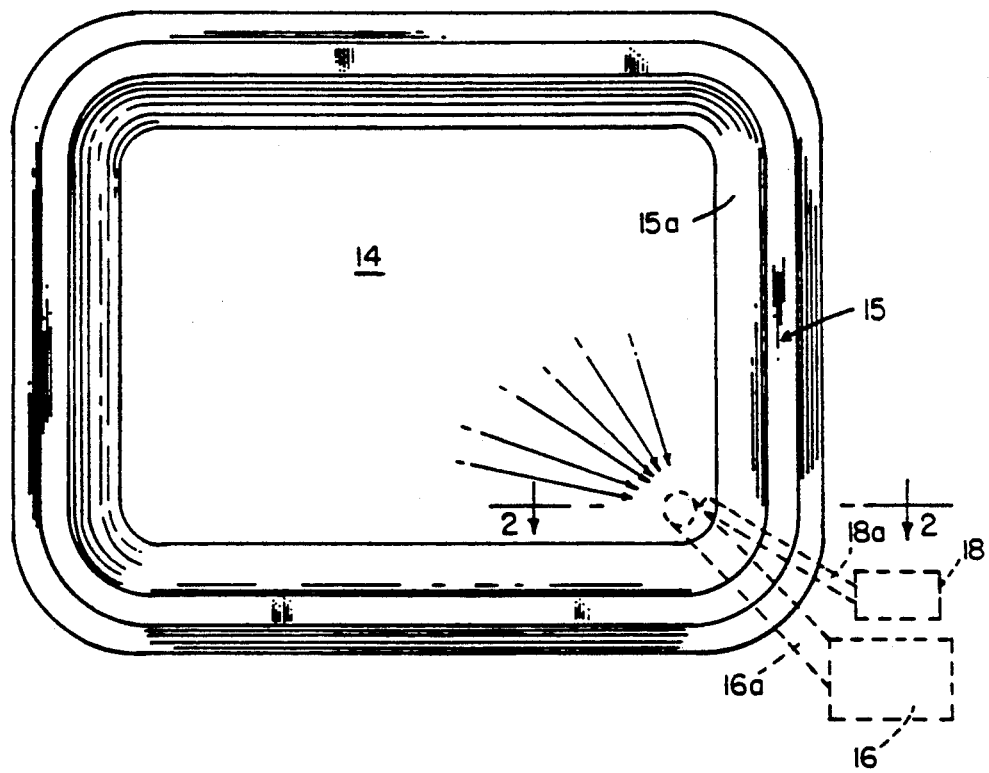
FIG. 1 is a layout of a typical storage site in accordance with the present invention.
Figure 2:
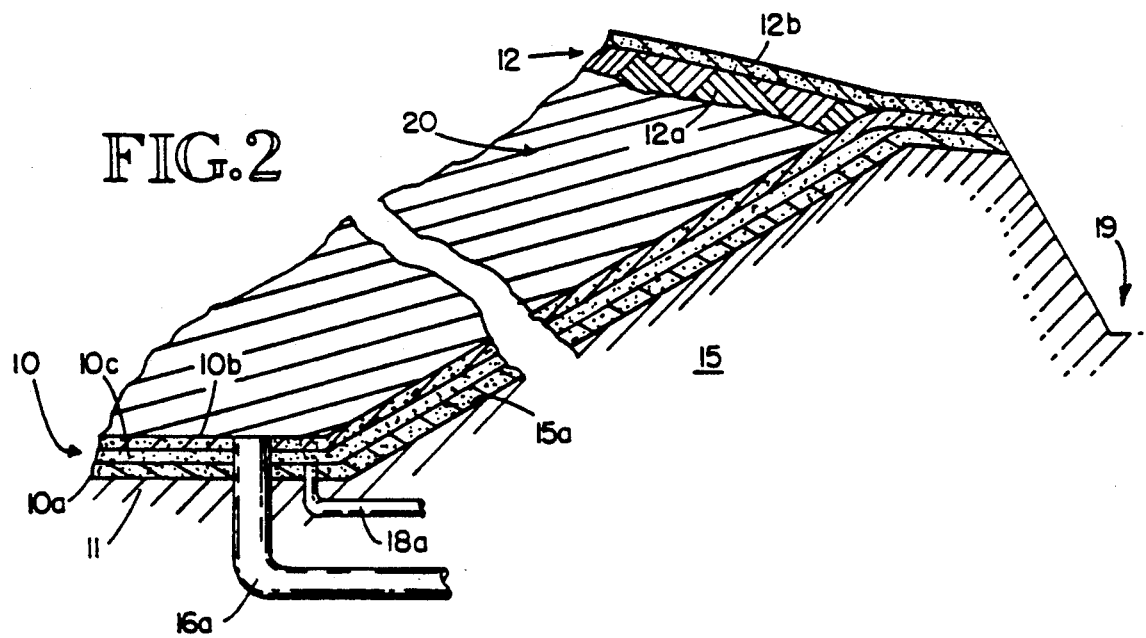
FIG. 2 is an enlarged fragmentary cross-section view taken as indicated by line 2—2 in FIG. 1 after preparation, filling, and covering of the storage site.

The waste storage system of the present invention utilizes materials and practices in the asphalt highway paving art. Much of the terminology hereinafter utilized is common to that art. For example, "dense-graded" asphalt concrete indicates that a full range of aggregate sizes are used, as for example, from dust (No. 200 sieve) to 1½"; and "open-graded" asphalt concrete indicates that only coarser sized aggregates are used, as for example, from No. 10 sieve to ⅜". In a dense-graded asphalt concrete the air voids are smaller and much lower in quantity (normally less than 4% by volume), than for conventional asphalt concrete whereas, in open-graded asphalt concrete, the voids are larger and higher in quantity (normally greater than 12% by volume). Furthermore, dense-graded asphalt concrete is substantially impermeable to water and other liquids, whereas the structure of open-graded asphalt concrete is porous to an extent allowing liquid such as leachate to freely drain through it.

In the practice of the present invention, a 3-layer liner 10 on a subgrade 11, and a 2-layer cap 12 on the stored solid waste material, are preferred for long-term storage facilities. The subgrade 11 is preferably similar to that prepared for highway paving, namely, compacted soil, gravel, crushed rock, or layers of these to provide a strong base on which to pave using standard highway asphalt paving equipment.

Normally the waste storage site will be many acres in size, and should be graded to drain to a collection basin. For purposes of example, the storage site may encompass a generally rectangular storage area 14 graded to slope downhill about 4 degrees to a primary catch basin 16 adjacent one corner. The storage site is surrounded by a berm 15 providing a sloped inner side wall 15a which typically may be 40 or 50 feet high.

The liner 10 covers the site 14, including the side wall 15a, and has a base layer 10a and top layer 10b of dense-graded, hot mix asphalt concrete, and an intermediate free-draining layer 10c of open-graded, hot mix asphalt concrete. The providing of two dense liquidimpermeable layers 10a, 10b is to provide a back-up layer in case a leak were to develop in the top layer 10b, such, for example, as a crack from a mild earthquake. The intermediate permeable layer 10c functions as a catchment in case of such a leak in the top layer 10b, and drains to a secondary catch basin 18. Liquid sensitive sensors may be placed in zones of the intermediate layer 10c, during the initial paving operations to assist in determining leak locations if they later develop.

The cap 12 preferably consists of a bottom soil cover 12a prepared generally in the same manner as the subgrade 11, and a lid layer 12b of dense-graded, hot mix asphalt concrete. The soil cover 12a is graded on the stored solid waste material 20 to provide a relatively even, compacted upper surface for receiving the lid layer 12b. The cap 12 should be crowned to drain to a peripheral gutter 19 which empties at appropriate drainage ports, or may be otherwise shaped and sloped to drain the cap 12. Standard highway grading equipment and techniques can be used to apply the compacted earth cover 12a as well as the subgrade 11.

Preferably, the asphalt material utilized as the binder for the lid layer 12b and the dense-graded liner layers 10a, 10b are polymer modified to contain polymer in an amount normally ranging between about 3% to 12% by weight of the asphalt. The polymers are preferably elastomeric and may be selected from the group comprising natural rubber, synthetic rubber, reclaimed rubber, polyethylene, polypropylene, ethyl-vinyl-acetate, or polyvinyl-chloride. It is preferred that the dense-graded layers have a minimum resilient modulus (Mr) of about 400,000 psi at 73° F. (ASTM D4123), and an indirect tensile strength (St) of about 150 psi at 73° F. (ASTM D4123). The dense-graded layers should be impermeable to the extent that they have permeability less than $1 \times 10^{-8}$ cm/sec when measured in accordance with ASTM D3637 or appropriate equivalent test procedure.

In the practice of the invention, a suitable site is appropriately excavated and graded to provide the storage area 14 and surrounding side wall 15a which are appropriately sloped and compacted. The subgrade 11 is then prepared and the layers of the 3-layer liner 10 are applied. A drain culvert 16a is arranged to drain from the upper surface of the liner 10 to a lined primary catch basin 16 for leachate, and a drain pipe 18a is provided from the bottom of the open-graded intermediate layer 10c to a secondary catch vessel or basin 18 for leak-detecting in the leachate. Solid waste material is dumped onto the liner 10 from time to time and leachate and rain water draining from the liner 10 are collected in the catch basin 16 for processing. When the storage site is full of solid waste material it is graded appropriately to receive the compacted cover layer 12a, formed in the same general manner as the subgrade 11. The latter fills irregularities in the upper surface of the solid waste material in preparation for application of the top layer 12b of dense-graded asphalt cement. It will be appreciated that the lid 12 can be applied in stages as the solid waste material is collected.

After the lid 12 has been applied, leachate from the stored material continues to drain into the leachate collection basin 16 for processing. Should a leak develop in the upper layer 10b, it will drain through the open-graded intermediate layer 10c and along the upper surface of the bottom dense-graded layer 10a for collection and detection. It will be appreciated that for temporary storage of solid waste materials, only the bottom dense-graded layer 10a of the line 10 need be used.

I claim:

1. A system for storage of solid waste material comprising:
   a storage basin having a subgrade of compacted soil and aggregate sloping toward a leachate collection site;
   a liner comprising:
   a dense-graded, hot-mixed asphalt concrete bottom layer covering said subgrade,
   an open-graded, hot-mixed asphalt concrete intermediate layer covering said bottom layer, and
   a dense-graded, hot-mixed asphalt concrete top layer covering said intermediate layer and draining from its upper surface to said leachate collection site;
   means for detecting leachate if it leaks into said intermediate layer;
   solid waste material stored on said top layer; and
   a cap covering said waste material and comprising a dense-graded, hot-mixed asphalt concrete cover layer merging at its periphery with said liner.

2. A system according to claim 1 in which said storage site has a peripheral berm and said bottom, intermediate and top layers extend over the inside face of said berm.

3. A system according to claim 1 in which said means for detecting leachate comprises a drain from said intermediate layer.

4. A system according to claim 1 in which the asphalt in each of said dense-graded layers is polymer modified.

* * * * *